United States Patent
Takemura

(10) Patent No.: US 10,351,660 B2
(45) Date of Patent: Jul. 16, 2019

(54) PHENOLIC RESIN COMPOSITION, EPOXY RESIN COMPOSITION, AND CURED EPOXY RESIN

(71) Applicant: JFE CHEMICAL CORPORATION, Tokyo (JP)

(72) Inventor: Kazuya Takemura, Chiba (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/034,653

(22) PCT Filed: Nov. 10, 2014

(86) PCT No.: PCT/JP2014/005620
§ 371 (c)(1),
(2) Date: May 5, 2016

(87) PCT Pub. No.: WO2015/072123
PCT Pub. Date: May 21, 2015

(65) Prior Publication Data
US 2016/0251473 A1 Sep. 1, 2016

(30) Foreign Application Priority Data

Nov. 12, 2013 (JP) ................................. 2013-233998
Aug. 22, 2014 (JP) ................................. 2014-169711

(51) Int. Cl.
| | |
|---|---|
| *C08L 63/00* | (2006.01) |
| *C08G 59/06* | (2006.01) |
| *C08G 8/04* | (2006.01) |
| *C08L 61/06* | (2006.01) |
| *C08G 65/48* | (2006.01) |
| *C08K 5/13* | (2006.01) |

(52) U.S. Cl.
CPC ............ *C08G 59/063* (2013.01); *C08G 8/04* (2013.01); *C08G 65/485* (2013.01); *C08L 61/06* (2013.01); *C08L 63/00* (2013.01); *C08G 2261/3325* (2013.01); *C08G 2261/3424* (2013.01); *C08K 5/13* (2013.01)

(58) Field of Classification Search
None
See application file for complete search history.

(56) References Cited

U.S. PATENT DOCUMENTS

| | | | | |
|---|---|---|---|---|
| 2,806,016 A | * | 9/1957 | Schwarzer | ........... C07D 303/24 |
| | | | | 525/472 |
| 3,013,087 A | * | 12/1961 | Schwarzer | ............. C07C 37/20 |
| | | | | 528/98 |
| 3,536,734 A | * | 10/1970 | Vegter | .................. C08G 59/063 |
| | | | | 528/97 |
| 4,390,680 A | * | 6/1983 | Nelson | ................. C08G 59/063 |
| | | | | 528/101 |
| 5,382,713 A | | 1/1995 | Wang et al. | |
| 6,451,879 B1 | | 9/2002 | Mori et al. | |
| 8,278,401 B2 | * | 10/2012 | Kong | ..................... C08G 59/30 |
| | | | | 257/789 |
| 2008/0021173 A1 | | 1/2008 | Nakanishi et al. | |
| 2011/0144272 A1 | * | 6/2011 | Shirrell | ................ C08G 59/027 |
| | | | | 525/139 |

FOREIGN PATENT DOCUMENTS

| | | |
|---|---|---|
| CN | 101921458 A | 12/2010 |
| CN | 102643621 A | 8/2012 |
| EP | 1 760 101 A1 | 3/2007 |
| EP | 2 368 930 A1 | 9/2011 |
| EP | 2669308 A1 | 12/2013 |
| JP | H11-1544 A | 1/1999 |
| JP | 2008-081546 A | 4/2008 |
| JP | 2010-229304 A | 10/2010 |
| KR | 1020010099661 | 11/2001 |
| WO | 2006/001395 A1 | 1/2006 |

OTHER PUBLICATIONS

Feb. 10, 2015 Search Report issued in International Application No. PCT/JP2014/005620.
Aug. 31, 2016 Extended European Search Report issued in European Patent Application No. 14862896.9.
Sep. 25, 2015 Office Action issued in Taiwanese Patent Application No. 103139068.
Jan. 3, 2017 Office Action issued in Chinese Patent Application No. 201480058869.X.
Sep. 12, 2017 Office Action issued in Chinese Patent Application No. 201480058869.X.
Apr. 14, 2017 Office Action issued in Korean Patent Application No. 2016-7011495.
Aug. 18, 2017 Notice of Allowance issued in Korean Patent Application No. 10-2016-7011495.

* cited by examiner

*Primary Examiner* — David J Buttner
(74) *Attorney, Agent, or Firm* — Oliff PLC

(57) ABSTRACT

A phenolic resin composition and an epoxy resin composition from which a cured epoxy resin having excellent heat resisting properties and a low dielectric constant can be produced. The phenolic resin composition contains a modified phenolic resin and a tetrakisphenolethane compound, the modified phenolic resin being prepared by condensation of a cyclic hydrocarbon compound having two or more unsaturated bonds and a compound having a phenolic hydroxyl group, in which the content of the tetrakisphenolethane compound is 3% to 60% by mass with respect to the total content of the modified phenolic resin and the tetrakisphenolethane compound. The epoxy resin composition is prepared by epoxidizing the phenolic resin composition. The cured epoxy resin is prepared by allowing the epoxy resin composition to react with a hardener.

14 Claims, No Drawings

PHENOLIC RESIN COMPOSITION, EPOXY RESIN COMPOSITION, AND CURED EPOXY RESIN

This application is a national stage of PCT/JP2014/005620, filed Nov. 10, 2014, which claims the benefit of priority to Japanese Application No. 2013-233998, filed Nov. 12, 2013, and Japanese Application No. 2014-169711, filed Aug. 22, 2014. The entire contents of the prior applications are hereby incorporated by reference herein in their entirety.

TECHNICAL FIELD

This application relates to a phenolic resin composition, an epoxy resin composition, and a cured epoxy resin.

BACKGROUND

Higher performance of chips, an increase in the number of layers of wiring boards, a wider spread of lead-free solders with high melting points, and so forth require electronic components, such as printed circuit boards and semiconductors, to have high heat resisting properties (glass transition temperature). To improve the speed of processing, circuit currents with higher frequencies are used, so peripheral members are polarized to cause transmission loss. Thus, there is an increasing demand for low-dielectric-constant materials, which are not easily polarized.

Known examples of resins conventionally used for printed circuit boards and semiconductor sealing materials include ortho-cresol novolac type epoxy resins and dicyclopentadiene type epoxy resins. While ortho-cresol novolac type epoxy resins have high heat resisting properties, they have high dielectric constants. This disadvantageously limits the use thereof, depending on the applications. While dicyclopentadiene type epoxy resins have low dielectric constants, they have insufficient heat resisting properties, depending on the applications. Thus, there has been a demand for a resin with good heat resisting properties and a low dielectric constant.

Patent Literature 1 discloses a phenolic resin prepared by allowing a compound having a benzene ring with one or more hydroxy groups to react with a dialdehyde compound and a formaldehyde-containing cross-linkable compound; an epoxidized phenolic resin prepared by epoxidation of the phenolic resin; an epoxy resin composition containing the phenolic resin and the epoxidized phenolic resin; and a cured product (cured epoxy resin) containing the epoxidized phenolic resin.

CITATION LIST

Patent Literature

PTL 1: Japanese Unexamined Patent Application Publication No. 2010-229304

SUMMARY

Technical Problem

According to studies, the cured epoxy resin disclosed in Patent Literature 1 has high heat resisting properties but is not reduced in dielectric constant.

It is an object of the disclosed embodiments to provide a phenolic resin composition and an epoxy resin composition from which a cured epoxy resin having excellent heat resisting properties and a low dielectric constant can be produced, and the cured epoxy resin.

Solution to Problem

Intensive studies were conducted in order to solve the foregoing problems and it was found that a cured epoxy resin having excellent heat resisting properties and a low dielectric constant is prepared by allowing an epoxy resin composition to react with a hardener, the epoxy resin composition being prepared by epoxidation of a phenolic resin composition containing a modified phenolic resin and a tetrakisphenolethane compound, the modified phenolic resin being prepared by condensation of a cyclic hydrocarbon compound having two or more unsaturated bonds and a compound having a phenolic hydroxyl group, the cyclic hydrocarbon compound being exemplified by a substituted cyclohexene compound, such as a dicyclopentadiene compound (hereinafter, sometimes referred to as a "DCPD compound"), and the content of the tetrakisphenolethane compound being 3% to 60% by mass with respect to the total content of the modified phenolic resin and the tetrakisphenolethane compound. The findings have led to the completion of the disclosed embodiments.

That is, the disclosed embodiments provide (1) to (6) described below.

(1) A phenolic resin composition contains a modified phenolic resin and a tetrakisphenolethane compound, the modified phenolic resin being prepared by condensation of a cyclic hydrocarbon compound having two or more unsaturated bonds and a compound having a phenolic hydroxyl group, in which the content of the tetrakisphenolethane compound is 3% to 60% by mass with respect to the total content of the modified phenolic resin and the tetrakisphenolethane compound.

(2) In the phenolic resin composition described in (1), the cyclic hydrocarbon compound having two or more unsaturated bonds is a substituted cyclohexene compound.

(3) In the phenolic resin composition described in (1) or (2), the tetrakisphenolethane compound is a tetrakisphenolethane compound in which one or more hydrogen atoms on an aromatic ring are substituted with alkyl groups.

(4) In the phenolic resin composition described in any one of (1) to (3), the compound having a phenolic hydroxyl group is at least one compound selected from the group consisting of phenolic compounds and naphthol compounds.

(5) An epoxy resin composition is prepared by epoxidizing the phenolic resin composition described in any one of (1) to (4).

(6) A cured epoxy resin is prepared by allowing the epoxy resin composition described in (5) to react with a hardener.

Advantageous Effects

According to the disclosed embodiments, it is possible to provide a phenolic resin composition and an epoxy resin composition from which a cured epoxy resin having excellent heat resisting properties and a low dielectric constant can be produced, and the cured epoxy resin.

The cured epoxy resin of the disclosed embodiments is useful for, in particular, applications, such as materials for printed circuit boards and materials for semiconductor sealing materials, required to have high heat resisting properties and low dielectric constants and, in addition, is useful as a material for structural members for use in, aircraft, automobiles, and so forth.

DETAILED DESCRIPTION

Features of the disclosed embodiments will be described below as compared with the related art.

One of the features of the disclosed embodiments is a phenolic resin composition containing a modified phenolic resin and a tetrakisphenolethane compound. Another feature is that the content of the tetrakisphenolethane compound is 3% to 60% by mass with respect to the total content of the modified phenolic resin and the tetrakisphenolethane compound. When the content of the tetrakisphenolethane compound is within the range, the resulting cured epoxy resin has excellent heat resisting properties and a low dielectric constant.

The phenolic resin composition, the epoxy resin composition, and the cured epoxy resin of the disclosed embodiments will be described in detail below.

[Phenolic Resin Composition]

The phenolic resin composition (hereinafter, sometimes referred to simply as a "phenolic resin composition of the disclosed embodiments") from which a cured epoxy resin having excellent heat resisting properties and a low dielectric constant can be prepared is a phenolic resin composition containing a modified phenolic resin and a tetrakisphenolethane compound, the modified phenolic resin being prepared by condensation of a cyclic hydrocarbon compound having two or more unsaturated bonds, such as a substituted cyclohexene compound, and a compound having a phenolic hydroxyl group (hereinafter, sometimes referred to simply as a "phenolic constituent"), and the content of the tetrakisphenolethane compound being 3% to 60% by mass with respect to the total content of the modified phenolic resin and the tetrakisphenolethane compound.

<Modified Phenolic Resin>

The modified phenolic resin of the disclosed embodiments may be produced by heating the cyclic hydrocarbon compound having two or more unsaturated bonds and a stoichiometrically excess amount of the phenolic constituent in the presence of an acid catalyst to perform a condensation reaction. For example, the phenolic constituent may be preferably used in an amount of 1.5 mol or more and 25 mol or less with respect to 1 mol of the cyclic hydrocarbon compound having two or more unsaturated bonds.

A temperature during the reaction is not particularly limited and may be appropriately set, depending on the type of acid catalyst. In the case of a boron trifluoride phenol complex, the temperature is preferably 20° C. to 170° C. and more preferably 50° C. to 150° C. The reaction is preferably performed in a state in which the water content is minimized. More preferably, the water content is 100 ppm or less on a mass basis.

After the completion of the reaction, the acid catalyst is neutralized with an alkaline catalyst neutralizer. The reason for this is that if the acid catalyst remains after the completion of the reaction, the reaction may proceed excessively when an unreacted phenolic constituent is removed by distillation in a downstream step.

After the neutralization of the acid catalyst, filtration is performed to remove the neutralizer and an acid catalyst residue. The filtration results in separation between a solid composed of the neutralizer and the acid catalyst residue and a filtrate including the unreacted phenolic constituent and a reaction product. The filtrate is distilled under reduced pressure to remove the unreacted phenolic constituent by distillation, thereby recovering a modified phenolic resin.

(Cyclic Hydrocarbon Compound Having Two or More Unsaturated Bonds)

The cyclic hydrocarbon compound having two or more unsaturated bonds is preferably a substituted cyclohexene compound. The substituted cyclohexene compound is preferably a compound having a structure in which the para, meta, or ortho positions of a cyclohexene ring or cyclohexene are bridged by a divalent hydrocarbon group. Specific examples thereof include dicyclopentadiene compounds (DCPD compounds). Examples of the dicyclopentadiene compounds (DCPD compounds) include dicyclopentadiene and dicyclopentadiene in which a freely-selected hydrogen atom is substituted with an alkyl group and/or an alkenyl group. Furthermore, 3a,4,7,7a-tetrahydroindene, 3a,4,7,7a-tetrahydroindene in which a freely-selected hydrogen atom is substituted with an alkyl group and/or an alkenyl group, norbornene in which a freely-selected hydrogen atom is substituted with a hydrocarbon group having an unsaturated bond, and alfa-pinene in which a freely selected hydrogen atom is substituted with a hydrocarbon group having an unsaturated bond are exemplified. Cyclohexene in which a freely-selected hydrogen atom is substituted with a hydrocarbon group having an unsaturated bond is also exemplified. A mixture of two or more of these compounds may be used. Dicyclopentadiene, 3a,4,7,7a-tetrahydroindene, 4-vinyl-1-cyclohexene, 5-vinyl-2-norbornene, limonene, or a mixture of two or more of these compounds is more preferred. Dicyclopentadiene, 3a,4,7,7a-tetrahydroindene, or a mixture of two or more of these compounds is still more preferred. Dicyclopentadiene is still yet more preferred. The alkyl group is preferably an alkyl group having 1 to 3 carbon atoms. Specific examples thereof include a methyl group, an ethyl group, a propyl group, and a 2-propyl group. The alkenyl group is preferably an alkynyl group having 2 or 3 carbon atoms. Specific examples thereof include a vinyl group (ethenyl group), a propenyl group, and 2-propenyl group. The divalent hydrocarbon group is preferably a divalent hydrocarbon group having 4 or less or 3 or less carbon atoms. A divalent hydrocarbon group having 3 or less carbon atoms is more preferred. Specific examples thereof include a methylene group, an ethylene group, and a propene-1,3-diyl group.

(Compound Having Phenolic Hydroxyl Group)

The compound having a phenolic hydroxyl group (phenolic constituent) is not particularly limited as long as the compound has a hydroxy group directly attached to an aromatic ring (for example, a benzene ring, a naphthalene ring, or an anthracene ring). Phenol, a compound in which one or more hydrogen atoms directly attached to the aromatic ring (benzene ring) of phenol are substituted with an alkyl group (hereinafter, sometimes referred to simply as a "phenol compound"), naphthol, a compound in which one or more hydrogen atoms directly attached to the aromatic ring (naphthalene ring) of naphthol are substituted with an alkyl group (hereinafter, sometimes referred to simply as a "naphthol compound"), and a mixture of two or more thereof are preferred. A mixture of the phenol compound and the naphthol compound is more preferred. A mixture of phenol and alfa-naphthol and/or beta-naphthol is still more preferred. A mixture of phenol and beta-naphthol is still yet more preferred.

The phenol compound is phenol or a compound in which one or more hydrogen atoms directly attached to the aromatic ring (benzene ring) of phenol are substituted with an alkyl group. Specific examples of the phenol compound include phenol, o-cresol, m-cresol, p-cresol, 2,3-dimethylphenol, 2,4-dimethylphenol, 2,5-dimethylphenol, 2,6-dimethylphenol, 3,4-dimethylphenol, 3,5-dimethylphenol, 2,3,4-trimethylphenol, 2,3,5-trimethylphenol, 2,3,6-trimethylphenol, 2,4,5-trimethylphenol, 2,4,6-trimethylphenol, and 3,4,5-trimethylphenol.

The naphthol compound is naphthol or a compound in which a hydrogen atom directly attached to the aromatic ring (naphthalene ring) of naphthol is substituted with an alkyl group. Naphthol is alfa-naphthol or beta-naphthol. Specific examples of the naphthol compound include alfa-naphthol and beta-naphthol.

The alkyl group is preferably an alkyl group having 1 to 3 carbon atoms. Specific examples thereof include a methyl group, an ethyl group, a propyl group, and a 2-propyl group.

In the case where a mixture of the phenolic compound and the naphthol compound is used as the phenolic constituent, the ratio of the phenolic compound to the naphthol compound on a mass basis is preferably 99:1 to 70:30 and more preferably 95:5 to 80:20. When the amount of the naphthol compound is within the range, a cured epoxy resin to be produced has excellent heat resisting properties. Furthermore, the amount of suspended matter formed is small in a process for producing a cured epoxy resin.

(Acid Catalyst)

The acid catalyst is used in producing the modified phenolic resin of the disclosed embodiments. The acid catalyst is preferably, but not particularly limited to, boron trifluoride, a boron trifluoride phenol complex, a boron trifluoride ether complex, or the like in view of easy handling and an excellent reaction rate.

The amount of the acid catalyst used in the reaction is not particularly limited. In the case of the boron trifluoride phenol complex, the amount of the acid catalyst is preferably 0.1 to 20 parts by mass and more preferably 0.5 to 10 parts by mass with respect to 100 parts by mass of the cyclic hydrocarbon compound having two or more unsaturated bonds.

(Softening Temperature of Modified Phenolic Resin)

The softening temperature of the modified phenolic resin to be produced may be controlled by adjusting the feed molar ratio of the compound having a phenolic hydroxyl group to the cyclic hydrocarbon compound having two or more unsaturated bonds (phenolic constituent/cyclic hydrocarbon compound having two or more unsaturated bonds) in producing the modified phenolic resin of the disclosed embodiments. That is, a higher molar proportion of the phenolic constituent fed results in a lower softening temperature of the modified phenolic resin. A lower molar proportion of the phenolic constituent fed results in a higher softening temperature of the modified phenolic resin.

The softening temperature of the modified phenolic resin of the disclosed embodiments is preferably, but not particularly limited to, 70° C. or higher and more preferably 80° C. or higher. A higher softening temperature of the phenolic resin results in a higher glass transition temperature of the cured epoxy resin to be produced, thereby enhancing the heat resisting properties.

<Tetrakisphenolethane Compound>

The tetrakisphenolethane compound used for the phenolic resin composition of the disclosed embodiments may be produced by allowing the phenolic constituent to react with a dialdehyde compound.

The phenolic constituent is not particularly limited as long as it is a compound having a hydroxy group directly attached to an aromatic ring (for example, a benzene ring, a naphthalene ring, or an anthracene ring). Phenol, a compound in which a hydrogen atom directly attached to the aromatic ring (benzene ring) of phenol is substituted with an alkyl group, or a mixture of two or more of these compounds is preferred. Phenol, o-cresol, m-cresol, p-cresol, 2,3-dimethylphenol, 2,4-dimethylphenol, 2,5-dimethylphenol, 2,6-dimethylphenol, 3,4-dimethylphenol, 3,5-dimethylphenol, 2,3,4-trimethylphenol, 2,3,5-trimethylphenol, 2,3,6-trimethylphenol, 2,4,5-trimethylphenol, 2,4,6-trimethylphenol, 3,4,5-trimethylphenol, or a mixture of two or more of these compounds is preferred.

As the dialdehyde compound, glyoxal and ethanedial are preferred.

Examples of the tetrakisphenolethane compound include 1,1,2,2-tetrakis(3-methyl-4-hyadroxyphenyl)ethane, 1,1,2,2-tetrakis(4-hydroxyphenyl)ethane, 1,1,2,2-tetrakis(3,5-dimethyl-4-hydroxyphenyl)ethane, and 1,1,2,2-tetrakis(3,5,6-trimethyl-4-hydroxyphenyl)ethane). These tetrakisphenolethane compounds may be used separately or in combination of two or more.

As the tetrakisphenolethane compound, a tetrakisphenolethane compound in which one or more hydrogen atoms on an aromatic ring (benzene ring) is substituted with an alkyl group is preferably used from the viewpoint of achieving excellent heat resisting properties and a low dielectric constant. More preferably, 1,1,2,2-tetrakis(3-methyl-4-hydroxyphenyl)ethane and/or 1,1,2,2-tetrakis(3,5,6-trimethyl-4-hydroxyphenyl)ethane is used.

<Method for Producing Phenolic Resin Composition>

The phenolic resin composition of the disclosed embodiments may be produced by mixing the modified phenolic resin with the tetrakisphenolethane compound. A mixing method, a temperature, and an atmosphere are not particularly limited.

The content of the tetrakisphenolethane compound is 3%$ to 60% by mass and preferably 5% to 50% by mass with respect to the total amount of the modified phenolic resin and the tetrakisphenolethane compound. When the content of the tetrakisphenolethane compound is less than 3% by mass or more than 60% by mass, a cured epoxy product to be produced does not have a low dielectric constant (has a high dielectric constant) and has low heat resisting properties.

[Epoxy Resin Composition]

The epoxy resin composition (hereinafter, sometimes referred to simply as an "epoxy resin composition of the disclosed embodiments") from which the cured epoxy resin having excellent heat resisting properties and a low dielectric constant is produced is an epoxy resin composition prepared by allowing the phenolic resin composition to react with an epoxidizing agent.

<Epoxidizing Agent>

As the epoxidizing agent, a conventionally-known epoxidizing agent may be used. The epoxidizing agent used is preferably, but not particularly limited to, epichlorohydrin in view of cost and reactivity.

<Method for Producing Epoxy Resin Composition>

The reaction of epoxidation is performed by the addition of the epoxidizing agent and sodium hydroxide in a solvent, such as dimethyl sulfoxide, at a reaction temperature of 0° C. to 150° C. and preferably 10° C. to 100° C., the epoxidizing agent being added in an amount 1 to 20 times the number of moles of the phenolic hydroxyl groups in the phenolic resin composition. When the reaction temperature is lower than the range, the reaction rate is low. When the reaction temperature is higher than the range, a side reaction is liable to occur, thereby reducing the yield of the epoxidized product. After the completion of the reaction, an extraction solvent, such as methyl isobutyl ketone, is added thereto. The resulting mixture is washed with water to remove by-product sodium chloride, and then the organic layer is recovered. The organic layer is distilled under reduced pressure to remove the extraction solvent, and then the epoxidized product (epoxy resin composition) is recovered.

[Cured Epoxy Resin]

The cured epoxy resin having excellent heat resisting properties and a low dielectric constant (hereinafter, sometimes referred to simply as a "cured epoxy resin of the disclosed embodiments") is a cured epoxy resin prepared by allowing the epoxy resin composition to react with a hardener.

The cured epoxy resin of the disclosed embodiments is useful for, in particular, applications, such as materials for printed circuit boards and materials for semiconductor sealing materials, required to have high heat resisting properties and low dielectric constants and, in addition, is useful as a material for structural members for use in, aircraft, automobiles, and so forth.

<Hardener>

As the hardener, a conventionally-known hardener may be used. Examples thereof include, but are not particularly limited to, amine-based compounds, acid anhydride-based compounds, amide-based compounds, compounds having a phenolic structure, and imidazole-based compounds. Specific examples of the hardener include diaminodiphenylmethane, diethylenetriamine, triethylenetetramine, diaminodiphenyl sulfone, isophoronediamine, dicyandiamide, phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, methylhexahydrophthalic anhydride, the phenolic resin of the disclosed embodiments bisphenol A, bisphenol F, bisphenol S, fluorene bisphenol, terpene diphenol, 4,4'-biphenol, 2,2'-biphenol, 3,3',5,5'-tetramethyl[1,1'-biphenyl]-4,4'-diol, hydroquinone, resorcinol, naphthalenediol, tris (4-hydroxyphenyl) methane, and 1,1,2,2-tetrakis(4-hydroxyphenyl)ethane. Polyamide resins synthesized from the dimer of linolenic acid and ethylenediamine are also exemplified. Examples of the hardener include polycondensates and modified products thereof, each of the polycondensates being derived from the compound having a phenolic structure (for example, phenol, alkyl-substituted phenol, naphthol, alkyl-substituted naphthol, dihydroxybenzene, or dihydroxynaphthalene) and formaldehyde, acetaldehyde, benzaldehyde, p-hydroxybenzaldehyde, o-hydroxybenzaldehyde, p-hydroxyacetophenone, o-hydroxyacetophenone, dicyclopentadiene, furfural, 4,4'-bis(chloromethyl)-1,1'-biphenyl, 4,4'-bis(methoxymethyl)-1,1'-biphenyl, 1,4-bis(chloromethyl)benzene, 1,4-bis(methoxymethyl)benzene, or the like. Halogenated bisphenol compounds, such as tetrabromobisphenol A, are also exemplified. In addition, imidazole, trifluoroboran-amine complexes, and guanidine derivatives are exemplified. Furthermore, condensates and the like derived from terpene and phenol compounds are exemplified. However, the hardener is not limited to these exemplified compounds. These compounds may be used alone or in combination of two or more.

<Method for Producing Cured Epoxy Resin>

The cured epoxy resin is produced by curing the epoxy resin composition with the hardener. The compounding ratio of the hardener is preferably 0.7 to 1.2 equivalents with respect to 1 equivalent of epoxy groups in the epoxy resin composition. When the compounding ratio is less than 0.7 equivalents or more than 1.2 equivalents with respect to 1 equivalent of the epoxy groups, curing is insufficient, so that good characteristics of the resulting cured product may not be obtained.

The curing temperature is preferably, but not particularly limited to, 100° C. to 250° C. and more preferably 130° C. to 220° C. A curing temperature higher than the range is liable to cause thermal deterioration of the resin, thereby possibly degrading the characteristics. A curing temperature lower than the range results in a reduction in the curing rate to reduce the productivity.

In the case of the cured epoxy resin of the disclosed embodiments, a hardening accelerator may be used in the stage of a curing reaction. Examples of the hardening accelerator include phosphorus-based compounds and amine-based compounds. Specific examples of the hardening accelerator include imidazole compounds, such as 2-methylimidazole, 2-ethylimidazole, and 2-ethyl-4-methylimidazole; tertiary amine compounds, such as 2-(dimethylaminomethyl)phenol and 1,8-diaza-bicyclo[5.4.0]undecene-7; phosphine compounds, such as triphenylphosphine; and metal compounds, such as tin(II) octoate. The hardening accelerator is used in an amount of 0.1 to 5.0 parts by weight with respect to 100 parts by weight of the epoxy resin composition. Among these, for example, triphenylphosphine, which is a phosphorus-based compound and very effective in accelerating hardening, is preferred.

Additives, such as a flame retardant, a lubricant, and an inorganic filler, may be included in the cured epoxy resin of the disclosed embodiments within the range in which the performance is not degraded.

<Heat Resisting Properties and Dielectric Constant of Cured Epoxy Resin>

The heat resisting properties of the cured epoxy resin of the disclosed embodiments are evaluated on the basis of a glass transition temperature. A higher glass transition temperature indicates higher heat resisting properties. The cured epoxy resin of the disclosed embodiments has a glass transition temperature of 160° C. or higher, preferably 165° C. or higher, and more preferably 170° C. or higher.

The dielectric constant of the cured epoxy resin of the disclosed embodiments is evaluated on the basis of a relative dielectric constant. A lower relative dielectric constant results in a lower dielectric constant. In this case, the cured epoxy resin is not easily polarized and thus has good high-frequency characteristics. The cured epoxy resin of the disclosed embodiments has a relative dielectric constant of 2.8 or less and preferably 2.75 or less, and more preferably 2.7 or less.

The disclosed embodiments will be more specifically described below by examples.

EXAMPLES

Example 1

Production of Modified Phenolic Resin

First, 278 g (2.9 mol) of phenol (manufactured by Wako Pure Chemical Industries, Ltd.) was charged into a 1-L reaction vessel (separable flask) equipped with a stirrer, a thermometer, a reflux apparatus, an inert gas inlet tube, and an oil bath and heated to 80° C. After the completion of the heating, 2.5 g of a boron trifluoride phenol complex (manufactured by Wako Pure Chemical Industries, Ltd.) was added thereto. The temperature of the mixture was increased to 140° C., and then 100 g (0.76 mol) of dicyclopentadiene was slowly added over a period of 2 hours. After the completion of the addition, aging was performed for 2 hours at 140° C. Then 10.0 g of calcium hydroxide (manufactured by Wako Pure Chemical Industries, Ltd.) was added thereto. The mixture was stirred for 30 minutes to neutralize the catalyst. After the completion of the stirring, the reaction mixture was filtered. The recovered filtrate was transferred to a vessel used for distillation under reduced pressure. The temperature of the filtrate was increased to 220° C. and distilled under reduced pressure, so that unreacted phenol was removed by the distillation under reduced pressure. A product (modified phenolic resin) in the flask was recovered in a molten state.

(Production of Tetrakisphenolethane Compound)

First, 200 g of ortho-cresol, 46.4 g of a 40% by mass aqueous solution of glyoxal, and 25 g of acetone was charged into 500-mL four-necked flask equipped with a reflux apparatus, a thermometer, a stirrer, and an oil bath. The temperature of the flask was set at 25° C. To the flask, 37.5 g of 95% sulfuric acid was added dropwise over a period of 2 hours. After the completion of sulfuric acid, the mixture was maintained at 30° C. for 2 hours. After cooling to 15° C., the mixture was neutralized with a 60% by mass aqueous solution of sodium hydroxide to yield a reaction mixture. To the reaction mixture, 260 g of acetone was added. The reaction mixture was then filtered. The resulting filtration residue was recovered, placed in another four-necked flask, and mixed with 260 g of methanol. The mixture was heated to reflux for 1 hour. The resulting solution was hot-filtered. Then 113 g of water was added to the solution. The organic layer was distilled under reduced pressure to remove methanol and then filtered to recover a solid tetrakisphenolethane compound.

(Epoxidation Reaction of Phenolic Resin Composition)

First, 40.5 g of the modified phenolic resin synthesized in section "Production of modified phenolic resin" described above, 4.5 g of the tetrakisphenolethane compound synthesized in section "Production of tetrakisphenolethane compound" described above, 92.5 g of epichlorohydrin, and 27.5 g of dimethyl sulfoxide were charged into a 500-mL four-necked flask equipped with a reflux apparatus, a thermometer, a stirrer, and an oil bath. The temperature was maintained at 40° C. Next, 1.0 g of sodium hydroxide was weighed on filter paper. After the weighing, sodium hydroxide was added thereto through a powder funnel. The addition of 1 g of sodium hydroxide was repeated 10 times every 10 minutes. Thereafter, the mixture was allowed to react at 50° C. for 2 hours and at 70° C. for another 1 hour. The temperature of the mixture was increased to 130° C. The mixture was distilled under reduced pressure to remove unreacted epichlorohydrin and dimethyl sulfoxide. After the flow of the distillation was stopped, the mixture was maintained for 15 minutes. The pressure was returned to atmospheric pressure. Methyl isobutyl ketone was added thereto. Then 4 g of an aqueous solution of 30% by mass sodium hydroxide was added thereto. The mixture was stirred for 1 hour and transferred to a separatory funnel. After the addition of 200 mL of distilled water, liquid-liquid extraction was performed by sufficiently shaking the mixture and allowing the mixture to stand. The liquid-liquid extraction was repeated until the aqueous layer was neutral. The organic layer was transferred to a 500-mL recovery flask. Methyl isobutyl ketone was removed with an evaporator. The pressure was returned to atmospheric pressure. The content was transferred to a sample bottle. Thereby, an epoxy resin composition was prepared.

The epoxy equivalent weight of the resulting epoxy resin composition was measured by a method described below and listed in Table 1.

(Production of Cured Product)

First, 1.2 g of the epoxy resin composition produced in section "Epoxidation reaction of phenolic resin composition", 0.79 g of 2-methylhexahydrophthalic anhydride serving as a hardener, and 0.04 g of triphenylphosphine serving as a hardening accelerator were placed in an aluminum cup. The mixture was melt-kneaded at 140° C. on a hot plate. Thermal curing was then performed at 140° C. for 1 hour, 160° C. for 1 hour, 180° C. for 1 hour, and 200° C. for 1 hour, thereby yielding a cured epoxy resin.

The heat resisting properties of the cured epoxy resin was evaluated on the basis of the glass transition temperature.

The glass transition temperature and the relative dielectric constant of the resulting cured epoxy resin were measured by methods described below and listed in Table 1.

<Measurement of Physical Properties>

(Softening Temperature of Modified Phenolic Resin)

The softening temperature (° C.) of a modified phenolic resin was measured according to JIS K2425 with a ring and ball softening point tester (Model: 25D5-ASP-MG, manufactured by MEITECH Company Ltd.) in a glycerol bath at a rate of temperature increase of 5° C./min.

(Epoxy Equivalent Weight of Epoxy Resin)

The epoxy equivalent weight of an epoxy resin composition was measured according to "Determination of epoxy equivalent in epoxy resins" described in JIS K7236:2001 and JIS K7236:2009.

(Glass Transition Temperature of Cured Epoxy Resin)

The glass transition temperature of a cured epoxy resin was measured as follows: An epoxy resin composition, a hardener, and a hardener accelerator were mixed together and thermally cured to produce a 0.3-mm-thick cured formed article. The article was cut into samples each having a 5 mm×5 mm square shape. Then, the measurement of the coefficient of thermal expansion was performed by a penetration method with a thermo-mechanical analyzer (TMA) serving as a thermal analysis instrument. The inflection-point temperature was defined as a glass transition temperature. The measurement was performed by applying a load of 1.0 g/mm$^2$ to the samples at a rate of temperature increase of 10° C./min.

When the glass transition temperature is 160° C. or higher, the cured epoxy resin has high heat resisting properties.

(Relative Dielectric Constant of Cured Epoxy Resin)

The relative dielectric constant of a cured epoxy resin was measured as follows: The 0.3-mm-thick formed article of the cured epoxy resin was cut into pieces each having a 40 mm×40 mm square shape. The pieces were polished with sandpaper to obtain smooth surfaces. The relative dielectric constant was measured by a coaxial resonator method with a dielectric constant measurement device (manufactured by AET, Inc.) at a resonant frequency of 1 GHz.

When the relative dielectric constant is 2.80 or less, the cured epoxy resin has a low dielectric constant.

Examples 2 to 20 and Comparative Examples 1 to 3

Cured epoxy resins were produced in the same way as in Example 1, except that the types of the cyclic hydrocarbon compounds each having two or more unsaturated bonds, the types of the compounds each having a phenolic hydroxyl group, the types of the tetrakisphenolethane compounds, and the relative amounts thereof were changed as listed in Table 1.

The amounts of the compounds used in each example will be described below.

In the case of producing the modified phenolic resin, the numbers of moles of the cyclic hydrocarbon compound having two or more unsaturated bonds and the compound having a phenolic hydroxyl group were equal to the numbers of moles of dicyclopentadiene and phenol, respectively, in Example 1. The mass of the acid catalyst was the same as in Example 1.

In the case of producing the tetrakisphenolethane compound, the number of moles of the phenolic compound used was equal to the number of moles of ortho-cresol in Example 1. Furthermore, glyoxal was used in the same amount as in Example 1.

In the case of the epoxidation of the phenolic resin composition, the modified phenolic resin and the tetrakisphenolethane compound were mixed together in a proportion described in Table 1 in such a manner that the total amount was 45 g, and then the epoxidation was performed as in Example 1. In particular, in Comparative example 1, 45 g of the modified phenolic resin alone was used without using the tetrakisphenolethane compound, and the epoxidation was performed as in Example 1. In the case of producing the cured epoxy resin, the equivalent ratio of the epoxy resin composition to the hardener was the same as in Example 1. The mass ratio of the hardening accelerator to the epoxy resin composition was the same as in Example 1.

Table 1 lists the results of evaluation of the physical properties.

Each of the cured epoxy resins according to the examples of the disclosed embodiments had high heat resisting properties and a low dielectric constant, compared with the comparative examples.

The invention claimed is:

1. A phenolic resin composition comprising a modified phenolic resin and a tetrakisphenolethane compound, the modified phenolic resin being prepared by condensation of a cyclic hydrocarbon compound having two or more unsaturated bonds and a compound having a phenolic hydroxyl group,
   wherein the content of the tetrakisphenolethane compound is in the range of 10% to 55% by mass with respect to the total content of the modified phenolic resin and the tetrakisphenolethane compound,
   a molar ratio of an amount of the compound having the phenolic hydroxyl group to an amount of the cyclic hydrocarbon compound in the preparation of the modified phenolic resin is at least 1.5:1, and
   the tetrakisphenolethane compound is selected from the group consisting of 1,1,2,2-tetrakis(3-methyl-4-hydroxyphenyl)ethane, 1,1,2,2-tetrakis(3,5-dimethyl-4-hydroxyphenyl)ethane, and 1,1,2,2-tetrakis(3,5,6-trimethyl-4-hydroxyphenyl)ethane).

2. The phenolic resin composition according to claim 1, wherein the cyclic hydrocarbon compound having two or more unsaturated bonds is a substituted cyclohexene compound.

3. The phenolic resin composition according to claim 2, wherein the compound having a phenolic hydroxyl group is at least one compound selected from the group consisting of phenolic compounds and naphthol compounds.

TABLE 1

| | | Phenolic resin composition | | | | | | Epoxy resin composition | Cured epoxy resin | |
|---|---|---|---|---|---|---|---|---|---|---|
| | | Modified phenolic resin (X) | | | | | | | | |
| | | Cyclic hydrocarbon compound having two or more unsaturated bonds | Compound having phenolic hydroxyl group | | $X_1:X_2$ (mass ratio) | Softening temperature (° C.) | Tetrakisphenolethane compound (Y)*¹ | Y/(X + Y) (% by mass) | Epoxy equivalent weight (g/equivalent) | Glass transition temperature (° C.) | Relative dielectric constant |
| | | | $X_1$ | $X_2$ | | | | | | | |
| Example | 1 | dicyclopentadiene | phenol | — | 100:0 | 92 | a | 10 | 265 | 182 | 2.60 |
| ple | 2 | dicyclopentadiene | phenol | — | 100:0 | 87 | b | 10 | 268 | 177 | 2.78 |
| | 3 | dicyclopentadiene | phenol | — | 100:0 | 93 | c | 10 | 270 | 173 | 2.62 |
| | 4 | dicyclopentadiene | phenol | — | 100:0 | 96 | d | 10 | 271 | 182 | 2.52 |
| | 5 | dicyclopentadiene | phenol | — | 100:0 | 92 | a | 5 | 255 | 167 | 2.75 |
| | 6 | dicyclopentadiene | phenol | — | 100:0 | 92 | a | 10 | 265 | 182 | 2.60 |
| | 7 | dicyclopentadiene | phenol | — | 100:0 | 92 | a | 50 | 272 | 178 | 2.65 |
| | 8 | dicyclopentadiene | phenol | β-naphthol | 90:10 | 95 | a | 10 | 265 | 189 | 2.65 |
| | 9 | dicyclopentadiene | phenol | β-naphthol | 90:10 | 95 | b | 10 | 268 | 187 | 2.72 |
| | 10 | dicyclopentadiene | phenol | β-naphthol | 90:10 | 95 | a | 5 | 257 | 174 | 2.74 |
| | 11 | dicyclopentadiene | phenol | β-naphthol | 90:10 | 95 | a | 50 | 269 | 180 | 2.64 |
| | 12 | dicyclopentadiene | phenol | β-naphthol | 80:20 | 99 | a | 5 | 257 | 178 | 2.74 |
| | 13 | dicyclopentadiene | phenol | β-naphthol | 60:40 | 100 | a | 5 | 257 | 174 | 2.78 |
| | 14 | dicyclopentadiene | phenol | β-naphthol | 70:30 | 99 | a | 5 | 257 | 176 | 2.76 |
| | 15 | dicyclopentadiene | phenol | β-naphthol | 95:5 | 94 | a | 5 | 257 | 170 | 2.74 |
| | 16 | 3a,4,7,7a-tetrahydroindene | phenol | — | 100:0 | 92 | a | 10 | 265 | 181 | 2.62 |
| | 17 | 5-vinyl-2-norbornene | phenol | — | 100:0 | 92 | a | 10 | 268 | 180 | 2.62 |
| | 18 | dicyclopentadiene | phenol | α-naphthol | 90:10 | 94 | a | 10 | 266 | 184 | 2.68 |
| | 19 | dicyclopentadiene | phenol | — | 100:0 | 92 | a | 4 | 256 | 165 | 2.78 |
| | 20 | dicyclopentadiene | phenol | — | 100:0 | 92 | a | 55 | 256 | 164 | 2.79 |
| Comparative example | 1 | dicyclopentadiene | phenol | — | 100:0 | 92 | — | 0 | 250 | 151 | 2.95 |
| | 2 | dicyclopentadiene | phenol | — | 100:0 | 92 | a | 1 | 250 | 152 | 2.85 |
| | 3 | dicyclopentadiene | phenol | — | 100:0 | 92 | a | 61 | 275 | 155 | 2.65 |

*¹a, 1,1,2,2-tetrakis(3-methyl-4-hydroxyphenyl)ethane; b, 1,1,2,2-tetrakis(4-hydroxyphenyl)ethane; c, 1,1,2,2-tetrakis(3,5-dimethyl-4-hydroxyphenyl)ethane; d, 1,1,2,2-tetrakis(3,5,6-trimethyl-4-hydroxyphenyl)ethane.

4. An epoxy resin composition prepared by epoxidizing the phenolic resin composition according to claim 2.

5. A cured epoxy resin prepared by reacting the epoxy resin composition according to claim 4 with a hardener.

6. The phenolic resin composition according to claim 1, wherein the compound having a phenolic hydroxyl group is at least one compound selected from the group consisting of phenolic compounds and naphthol compounds.

7. An epoxy resin composition prepared by epoxidizing the phenolic resin composition according to claim 6.

8. A cured epoxy resin prepared by reacting the epoxy resin composition according to claim 7 with a hardener.

9. An epoxy resin composition prepared by epoxidizing the phenolic resin composition according to claim 1.

10. A cured epoxy resin prepared by reacting the epoxy resin composition according to claim 9 with a hardener.

11. The cured epoxy resin according to claim 10, wherein the cured epoxy resin has a glass transition temperature of 160° C. or higher.

12. The cured epoxy resin according to claim 10, wherein the cured epoxy resin has a relative dielectric constant of 2.8 or less.

13. The phenolic resin composition according to claim 1, wherein the content of the tetrakisphenolethane compound is in the range of 10% to 50% by mass with respect to the total content of the modified phenolic resin and the tetrakisphenolethane compound.

14. The phenolic resin composition according to claim 1, wherein a softening temperature of the modified phenolic resin is 70° C. or higher.

* * * * *